United States Patent [19]

Boden et al.

[11] 4,129,636

[45] Dec. 12, 1978

[54] PROCESS FOR PROVIDING MIXED FOAMABLE REACTANTS TO A MOLD

[75] Inventors: Heinrich Boden, Opladen; Ulrich Knipp, Schildgen-Nittum, both of Germany

[73] Assignee: Bayer Aktiengesellschaft, Leverkusen, Fed. Rep. of Germany

[21] Appl. No.: 742,937

[22] Filed: Nov. 18, 1976

Related U.S. Application Data

[62] Division of Ser. No. 558,515, Mar. 14, 1975, Pat. No. 4,013,391.

[30] Foreign Application Priority Data

Mar. 20, 1974 [DE] Fed. Rep. of Germany ....... 2413337

[51] Int. Cl.² ............................................. B29D 27/00
[52] U.S. Cl. ..................................... 264/51; 264/328; 264/DIG. 83
[58] Field of Search ........ 264/278, 328, 329, DIG. 83

[56] References Cited

U.S. PATENT DOCUMENTS

| 2,398,318 | 4/1946 | MacMillin | 264/329 X |
| 2,448,676 | 9/1948 | MacMillin | 264/329 X |
| 3,712,777 | 1/1973 | Sherer | 264/329 X |
| 3,793,415 | 2/1974 | Smith | 264/328 X |
| 3,984,510 | 10/1976 | Chandra et al. | 264/329 X |

FOREIGN PATENT DOCUMENTS 46-7186  2/1966  Japan ...................... 264/329

Primary Examiner—Philip Anderson
Attorney, Agent, or Firm—Gene Harsh; Joseph C. Gil; William E. Parry

[57] ABSTRACT

A process is provided for introducing mixed foamable reactants to a mold. The process involves introducing the reactants into a mixing chamber through injection apertures in its side wall portion. The mixing chamber has an outlet aperture communicating with the cavity of the mold. Prior to introducing the reactants into the mixing chamber, a displacement piston having a smaller cross-section than the mixing chamber is inserted into the outlet aperture of the mixing chamber so that the injection apertures communicate with the mold cavity by means of a generally annular passage.

1 Claim, 12 Drawing Figures

PROCESS FOR PROVIDING MIXED FOAMABLE REACTANTS TO A MOLD

This is a division, of application Ser. No. 558,515, filed Mar. 14, 1975, issued as U.S. Pat. No. 4,013,391.

FIELD OF THE INVENTION

This invention relates to a process for filling the mold cavity with a foamable reaction mixture of chemical components. The process involves the use of an apparatus containing a mixing chamber into which injection apertures open and in which an ejector piston is displaceably mounted, which piston may be designed to function also as a control piston, and the outlet aperture of the mixing chamber opens into the internal cavity.

BACKGROUND OF THE INVENTION

The object of this method is that when the molded product is removed, the residue of reacted mixture in the mixing chamber is removed at the same time. This is made possible by the fact that the plane of separation of the molding tool also extends across the mixing chamber. The mixing apparatus may consist of a mixing head fixed to the molding tool or it may be directly integrated with the wall of the mold.

The disadvantage of such apparatus is that if one of the components moves ahead faster than the others, a small portion of it enters the mold cavity without first being mixed and causes faults in or on the finished molded product.

Various methods have been utilized to overcome this difficulty, e.g. absolute synchronization of the injection of the various components. However, the viscosity of the components varies over the course of time and the pressures in the conduits fluctuate slightly. These irregularities are enough to cause the faults mentioned above. Another disadvantage is that the mixing chamber still contains too much air even when its volume is reduced to about 1 cm$^3$, and when the components flow into the chamber the air is beaten into the mixture and is liable to form bubbles on the surface of the molding. Previous attempts to overcome this difficulty by either providing restrictors in the overflow of the mixing chamber or by providing deflectors and the like in order to obtain a quiet flow of mixture with a flow front free from bubbles have achieved only a moderate degree of success. Remixing devices were therefore, arranged between the mixing chamber and the mold cavity. These devices consisted for example, of a system of channels which branch and recombine. This makes the whole apparatus very complicated and expensive to manufacture. Moreover, the sealing problems are increased and the material wastage when producing the molded products is relatively high.

It is an object of this invention to provide an method by which perfect molded products can be produced, i.e. products which have no faults due to unmixed component residues or bubbles. The molded article should preferably be produced without loss of material in sprue channels.

SUMMARY OF THE INVENTION

According to the invention, this problem is solved by providing a displacement piston situated in the wall of the molding tool facing the outlet aperture of the mixing chamber and adapted to be moved into the mixing chamber.

The displacement piston can therefore be moved into the mixing chamber before the mixing process is begun. A gap is left between the bottom of the mixing chamber and the end surface of the displacement piston, the injection apertures or nozzles being directed into this gap.

The result of producing this small mixing chamber with an annular discharge channel surrounding the displacement piston is that the components are first mixed extremely vigorously with practically no air being beaten into the mixture. If any air is included, however, it becomes extremely finely divided and is therefore harmless. The mixture then flows in a united flow front into the internal chamber of the molding tool. Towards the end of the mixing process, the displacement piston is returned to its original position so that its end surface forms one continuous plane with the adjacent wall of the mold. Surface marks are thereby avoided. If a mixing chamber with ejector piston of the kind described in U.S. Pat. No. 3,706,515 is used, for example, it is possible to produce a molded article which is completely free from sprue marks because after the filling process, the mixtures in the mixing chamber can be forced into the mold cavity by pushing the ejector piston forwards until its end surface is continuous with the wall of the mold. Such a molded article requires no finishing operation.

DETAILED DESCRIPTION OF THE INVENTION

The displacement piston is preferably driven hydraulically or pneumatically but mechanical or electromagnetic operating devices may also be used. To optimise the operation, the displacement piston may be coupled to the on and off switch of the mixing apparatus by means of a hydraulic, pneumatic or electric control system, so that, for example, when the mixing apparatus is switched on, the operating mechanism for the displacement piston is released to push the piston into the mixing chamber. Only then will the injection apertures open to release the components into the mixing chamber. When the mixing apparatus is switched off, the displacement piston is returned to its starting position before the injection apertures are closed. If the ejector piston described above is used, it usually serves as control piston at the same time and returns the components to circulation by passing them through channels while it displaces the residue of mixture from the mixing chamber. The ejector piston is usually controlled by a time delay element so that it comes into operation later than the displacement piston. In special cases, however, the two movements may be simultaneous.

The displacement piston affords the added advantage that it can be used as ejector for the molded article when the molding tool has been opened.

According to a special embodiment of the invention, the displacement piston is provided with an adjustment screw to fix the depth of penetration into the mixing chamber.

In this way, the distance of the end surface of the displacement piston from the bottom of the mixing chamber, which may, for example, be formed by the end surface of an ejector piston, can always be adjusted to the specific mixing properties of the components and their rate of throughflow.

The same purpose is served by another preferred embodiment according to which the displacement piston is exchangeable. The internal cross-section of the annular channel between displacement piston and wall of mixing chamber can thereby be adjusted to the individual requirements by selecting displacement pistons with different diameters.

According to previous experience, the smallest distance between the end surface of the displacement piston and the bottom of the mixing chamber should be 1 mm. The diameter of the mixing chamber may be, for example, 16 mm and the distance of the lower edge of the ejection apertures or nozzles to the mouth of the mixing chamber 65 mm. The distance of the end surface of the displacement piston from the lower edge of the injection apertures or nozzles may be 0 to 60 mm. If a displacement piston with a diameter of 10 mm is used, a mixture with a viscosity of 500 cP may be ejected at the rate of 500 l/min. If the mixture has the viscosity of 1000 cP, the amount which can be ejected is reduced to 300 l/min. If a displacement piston with a diameter of 12 mm is used, the quantity of mixture with a viscosity of 500 cP which can be ejected is 200 l/min. If the viscosity is 1000 cP, only 150 l/min can be put through the apparatus. Lastly, if a displacement piston with a diameter of 14 mm is used, a mixture with a viscosity of 500 cP cannot be ejected at a rate of more than 90 l/min. If the viscosity is 1000 cP, the amount of mixture which can be passed through is only 60 l/min. It goes without saying that the lower the viscosity the greater can generally be the depth of penetration of the displacement piston. This depth can be used to regulate the pore size when producing foam products because this depends on the pressure in the mixing chamber. If the depth of penetration is increased, the pressure is increased and coarser pores are obtained. At the same time, the flow is also calmer.

If sufficiently rapidly reacting mixture is used, a foam with an integral structure can be produced by varying the depth of penetration during the process of filling the mold, i.e. it is possible to produce a foam in which the pore size progressively increases and hence the density progressively decreases from the surface to the interior.

Special mixing and flow effects can also be obtained by giving the end surface of the piston a convex or concave curvature. Theoretically, the circumference of the displacement piston could also be given other structures such as a spiral form or the piston could be made cone shaped, but difficulties then occur in sealing the displacement piston and removing the finished product from the mold.

The displacement piston is preferably coupled with a bias spring. The purpose of this spring is to ensure that the volume of the mixing chamber will be as small as possible immediately before and at the beginning of the mixing process so that as little air as possible is beaten into the mixture. As the mixing process progresses, the pressure building up in the mixture pushes the displacement piston back as far as the adjusted bias tension permits. It should be understood that instead of using a mechanical bias spring, the bias tension may be produced by hydraulic or pneumatic means.

According to another special embodiment according to the invention, part of the wall of the molding tool facing the outlet aperture of the mixing chamber is formed by an insert which is adjustable in its distance to the outlet aperture. The displacement piston is preferably mounted in this insert. Alternatively, the displacement piston may be passed through the insert and mounted in a housing attached to the molding tool.

The advantage of this embodiment is that the speed of radial distribution at the closing end of the mixing chamber can be adjusted by varying the height of the cross-section of outflow, taking into account the viscosity of the reaction mixture. At the beginning of the phase of introduction of the mixture, the distance between the wall part and the mouth of the mixing chamber should be between 0.5 mm and 15 mm, depending on the viscosity, and in the course of this phase or towards the end of it the distance should be increased at this point to the desired thickness of the molded product. This ensures that a continuous flow front can be obtained even in mixtures which are difficult to handle, so that pits and faults in the interior and on the surface of the molded product can be prevented.

Although the main purpose of the method according to the invention is the production of a molded product without sprue marks, which necessarily entails the omission of a sprue channel, the invention is also particularly advantageous used in conjunction with a sprue channel if the mixture has exceptionally poor flow properties or if a molded product with a very complicated shape is to be produced.

According to another feature of the invention, therefore, a sprue channel is arranged between the mixing apparatus and the mold cavity.

According to another embodiment of the invention, the displacement piston is subdivided into a displaceable sleeve and a core.

Two alternatives are provided: (a) the core is fixed to the molding tool or (b) the core is displaceable inside the sleeve and cooperates with an abutment.

The object of these alternatives is to form a cavity inside the sleeve at the beginning of the filling process to catch the first portions of injected components because these are found by experience to be incompletely mixed. As the filling process progresses, the mixture in this cavity becomes thoroughly stirred up and is at least partly discharged from the apparatus and replaced by fresh mixture. In this way, the first portions of components are also made to react because they are sufficiently mixed.

In the first example, the depth of the cavity inside the sleeve depends on the depth to which the sleeve enters the mixing chamber when the end surface of the core in the position of rest forms one continuous plane with the end surface of the sleeve and the surface of the wall of the mold in order to produce a molded article with a smooth surface. The second example avoids this relatively deep and voluminous cavity because the depth of the cavity can be adjusted as desired by means of the abutment. On moving into the mixing chamber, the sleeve and core are displaced until both bear against their abutments. On the return movement, the sleeve carries the core with it into the inoperative position.

It goes without saying that the movable core may be controlled hydraulically instead of by means of an abutment. This would allow for a third variation in which the cavity inside the sleeve could be slowly displaced right from the beginning of the filling operation so that the end surfaces of sleeve and core already form a continuous plane inside the mixing chamber. Although this third variation is not difficult to execute in practice, it does appear to be rather complicated and expensive.

It is obvious that if a suitable hydraulic control is provided, the sleeve may also be used as ejector for the finished molded article.

BRIEF DESCRIPTION OF THE DRAWINGS

Several examples of the apparatus used according to the invention are illustrated schematically in the drawing and described below.

In FIGS. 1 and 2 the apparatus consists of the mixing apparatus 1 and molding tool 2. The mixing apparatus 1 is integrated with the wall of the upper molding box 3 and consists basically of the mixing chamber 4 and ejector piston 5 which doubles as a control piston and which is displaceable inside the bore which forms the mixing chamber 4. It ends in a hydraulic cylinder 6. Pumps 7 and 8 deliver the components which enter the mixing chamber 4 through injection apertures 9, 10 (FIG. 1) or pass through channels 11, 12 in the ejector piston 5 to the recirculation ducts 13, 14 (FIG. 2). In the lower part 15 of the mold is a hydraulic cylinder 16 which contains a displacement piston 17 which extends through the mold cavity 18 into the mixing chamber 4. The mixing chamber proper extends between the end surface 19 of the displacement piston 17 and the end surface 20 of the ejector piston 5 which in this case also forms the base of the mixing chamber. At the other end, the displacement piston 17 is provided with a coaxial rod 21 which extends outside the hydraulic cylinder 16 and is associated with an adjustable abutment screw 22. It determines the depth of penetration of the displacement piston 17 into the mixing chamber 4. The whole operation of the apparatus is adapted to be controlled by a control device 23. Its construction can best be described in conjunction with its mode of operation: When the apparatus is completely at rest, it takes up the position shown in FIG. 2. A switch 24 simultaneously switches on the pumps 7 and 8 for the components and the pumps 24 and 26 for the control devices 27 and 28 of the ejector piston 5 and of the displacement piston 17. The ejector piston 5 remains in the withdrawn position (FIG. 2) until the initial vibrations in the feed conduits of the components have settled down. At this time, the pumps 25 and 26 deliver back into the storage container 31, 32 for hydraulic liquid by way of excess pressure valves 29 and 30. After the expiration of this time interval, which can be adjusted by means of a time delay relay in the switch 24, the said relay transmits an impulse to a time control 33 which shifts the three-way valves 34, 35 into the position shown in FIG. 1, by means not shown in the drawing. The ejector piston 5 is thereby moved into the position shown in FIG. 1 and the components enter the mixing chamber 4 through the ejection apertures 9, 10. At the same time, the time control 33 activates a second time control 36 which switches the three-way valves 37, 38 into the position shown in FIG. 1. At the same time that the ejector piston 5 is withdrawn, therefore, the displacement piston 17 is moved into the mixing chamber 4. A bias spring 39 serves to keep the actual mixing space between the end surfaces 19 and 20 as small as possible at first and then enables the displacement piston 17 to yield as the pressure of the mixing chamber 4 rises so that the volume in the mixing chamber is increased. The risk of air beating into the mixing chamber at the beginning of the mixing process is thereby prevented. The time control 33 contains an adjustable time relay which adjusts the mixing time, which is substantially equal to the time required for filling the mold. After the expiration of this time interval, the time relay activates the time control 36 and switches the valves 37 and 38 into the position shown in FIG. 2 so that the displacement piston also takes up the position shown in FIG. 2. Another time relay now shifts the three-way valve 34 and 35 to move the ejector piston 5 into the position shown in FIG. 2 with a delay of fractions of a second. All the pumps continue to operate to deliver the components backwards, and the hydraulic liquids return to the storage container 31, 32 through the excess pressure valves 29 and 30. The upper mold box 3 is removed to remove the molded product. A contact (not shown) in the time control 36 releases an impulse to switch the valve 38 to return flow. The force of the bias spring 39 is thereby brought into operation and the displacement piston 17 serves as ejector for the molding tool 2 by lifting the finished molded product from the lower molding box 15. The product can then easily be removed. After cleaning the mold cavity 18 if necessary, the molding tool is again closed. The aforesaid contact (not shown) in the time control 36 produces an impulse which moves the valves 37 and 38 into the position shown in FIG. 2 so that the displacement piston 17 returns to the position of FIG. 2. If the apparatus is operated completely automatically, the time control 36 is equipped with a time relay which after completion of the last step described above, transmits an impulse to the time control 33 corresponding to that transmitted by the switch 24 to the time control 33 after the expiration of its time delay relay. This means that the mold filling process then begins again from the beginning. If the apparatus is completely switched off, the switch 24 must be operated to switch on the drives to all the pumps. In the case of a semiautomatic apparatus, the time control 33 may be provided with an additional switch 39 which releases the beginning of a fresh mold filling process when manually operated while the pumps are in continuous operation.

In FIGS. 3 and 4, the apparatus consists of a mixing apparatus 40. It is arranged in the upper molding box 41 and consists basically of the mixing chamber 42 in the extended bore of which an ejector piston 43 is displaceable. The construction of the mixing apparatus 40 is otherwise basically the same as in the example shown in FIGS. 1 and 2.

Figure 1:
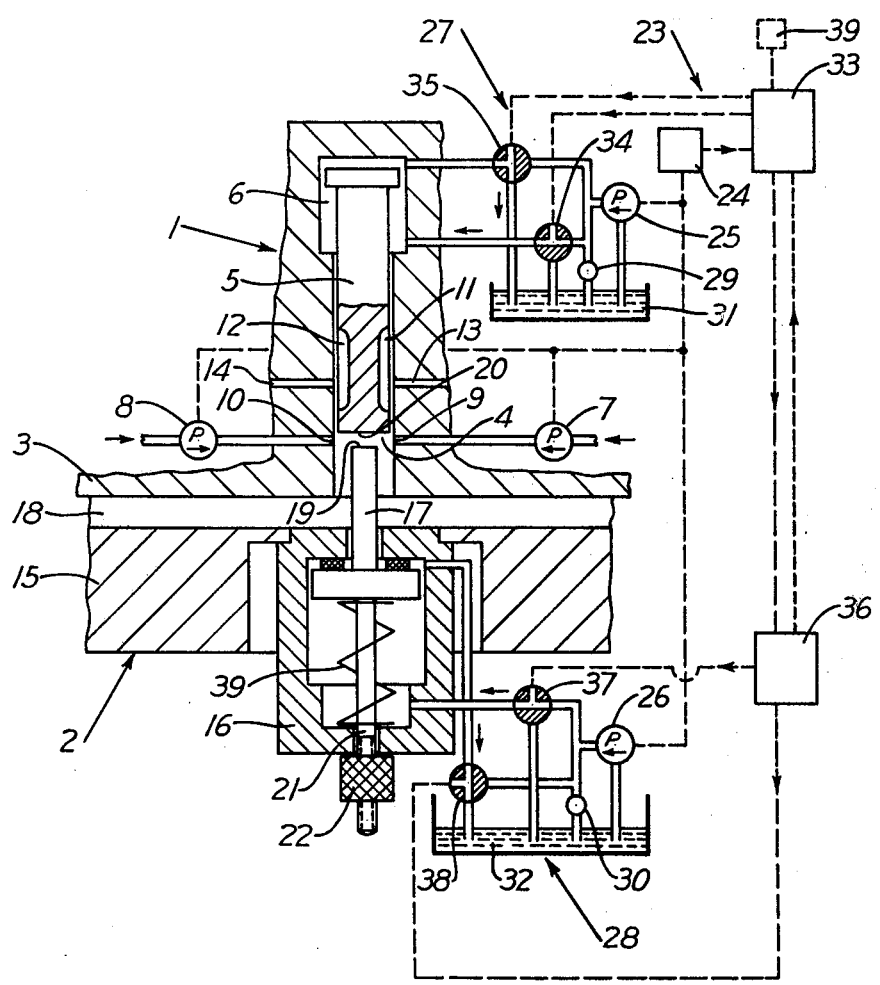
FIG. 1 illustrates a first example of the apparatus during the mold filling process.
Figure 2:
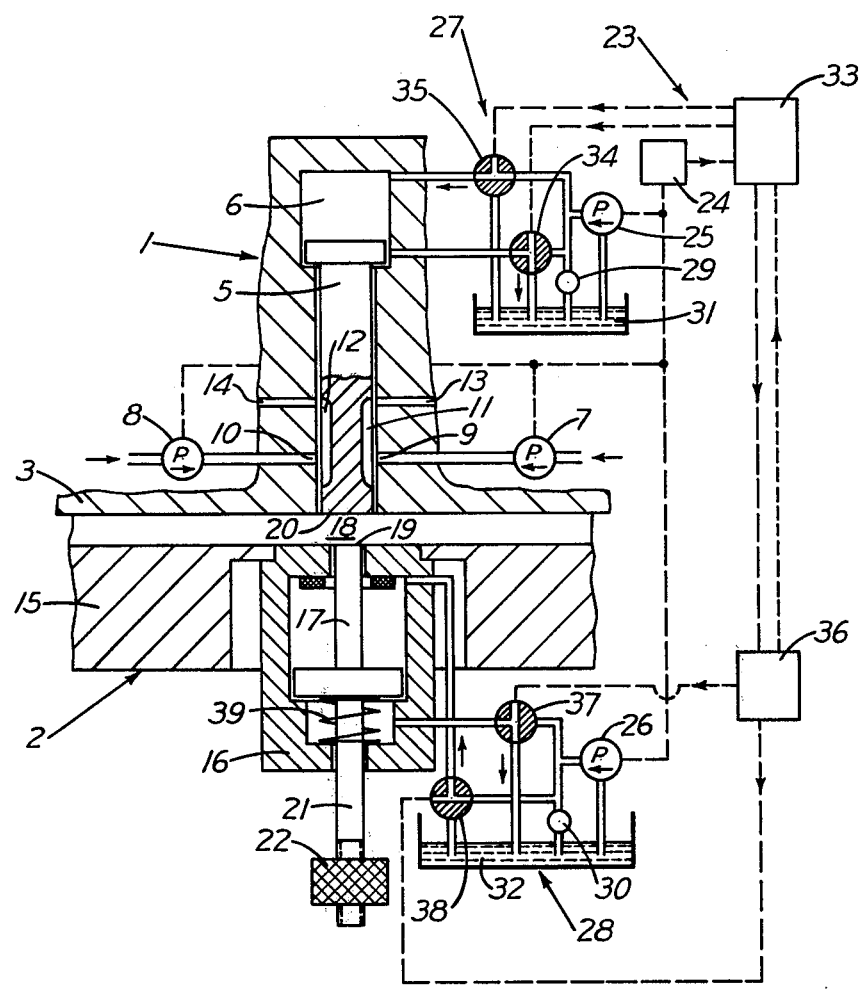
FIG. 2 shows the first example of the apparatus immediately after completion of the mold filling process.

That part of the wall of the lower molding box 45 which faces the outlet aperture 44 of the mixing chamber 42 is formed by an insert 46 which is adjustable in its position to the outlet aperture 44. The surrounding wall part 47 is formed as a hydraulic cylinder 48. The insert 46 contains a displacement piston 49 which moves in a hydraulic cylinder 50. It is operated in the same way as in the example of FIGS. 1 and 2 except that the adjustable abutment and bias spring are omitted. The hydraulic control device for the insert 46 is constructed in the same way as for the displacement piston. The whole control arrangement is similar to that of the first example but with suitable intermediate members for controlling the insert 46.

Figure 3:
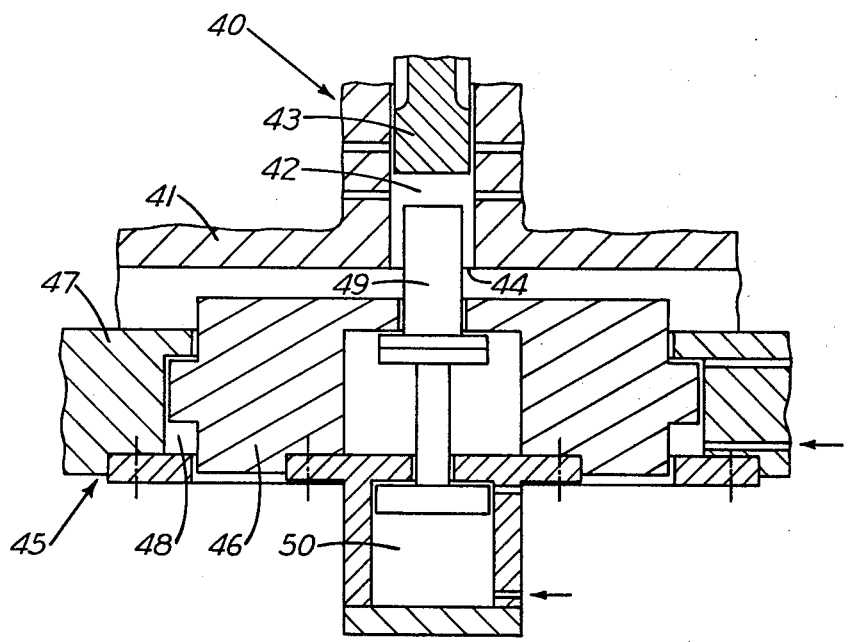
FIG. 3 shows a second example of the apparatus during the mold filling process.
Figure 4:
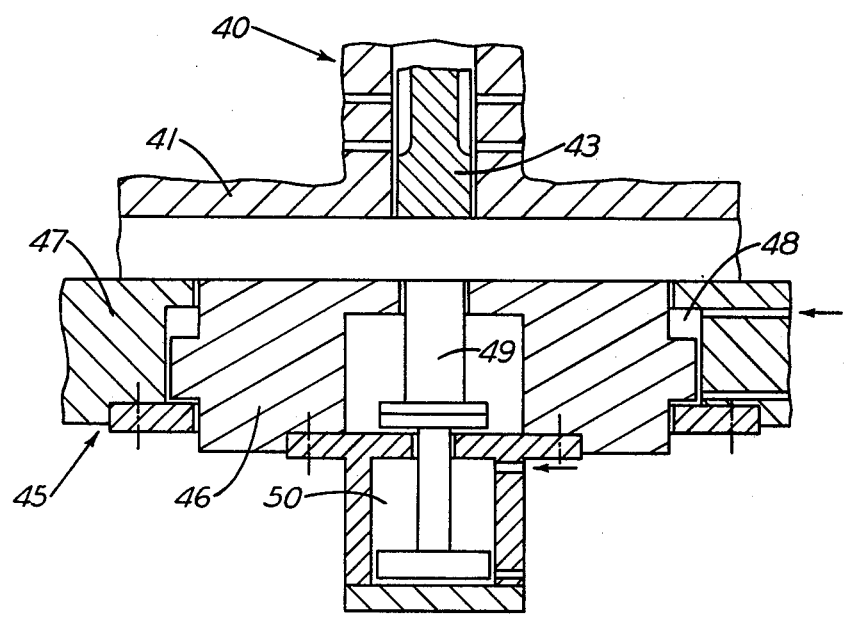
FIG. 4 shows the second example of the apparatus immediately after completion of the mold filling process.

In FIG. 3 the apparatus is shown in the mold filling mode. Both the displacement piston 49 and the insert 46 are extended in the direction of the mixing chamber. In FIG. 4 the apparatus is shown in the at-rest position with both the insert 46 and the piston 49 flush with the lower wall of the mold 47.

Figure 5:
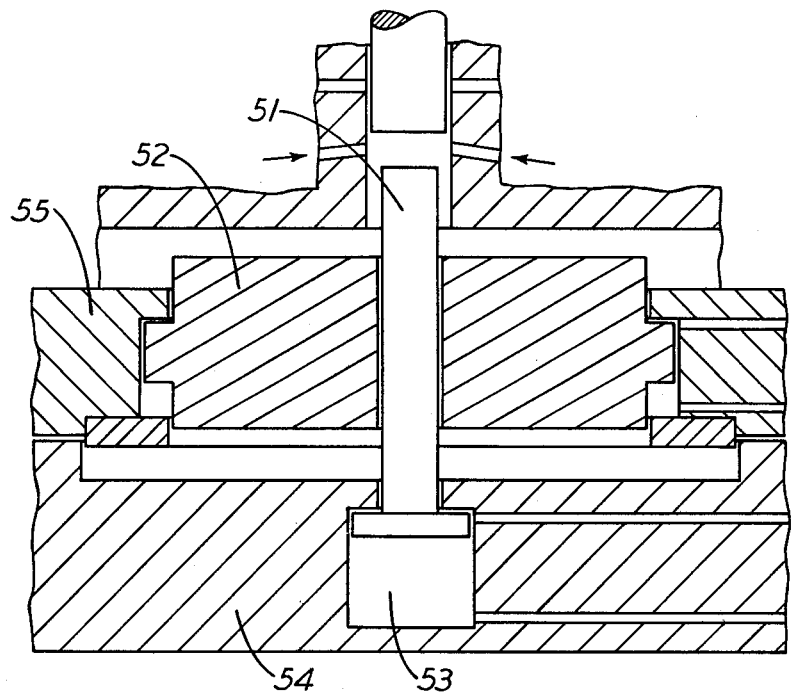
FIG. 5 shows a third example, being a modification of the second example, during the mold filling process.
Figure 6:
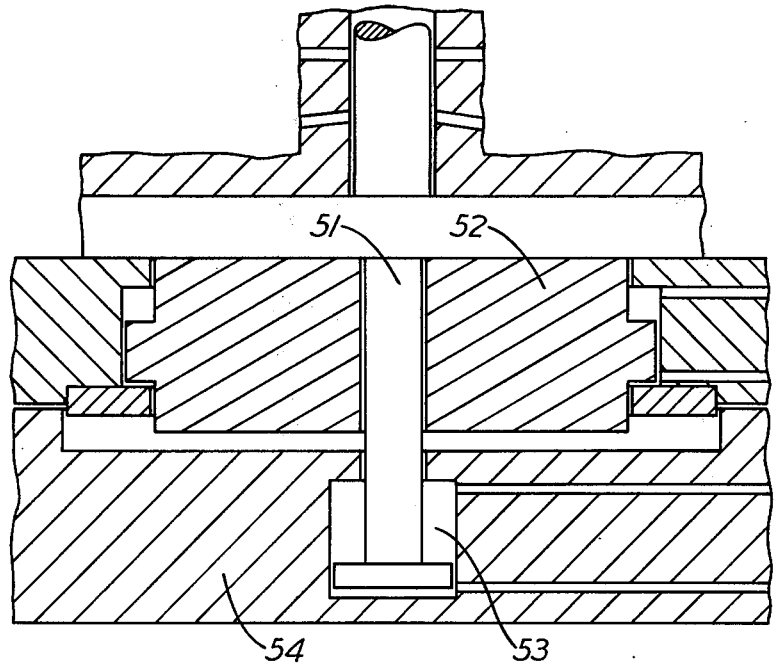
FIG. 6 shows the third example of the apparatus immediately after the filling process.

The apparatus shown in FIGS. 5 and 6 differs from the example in FIGS. 3 and 4 merely by the fact that the displacement piston 51 extends through the insert 52 and ends in a hydraulic cylinder 53 the housing 54 of which is attached to the lower molding box 55 outside the region of the insert 52. FIG. 5 shows the apparatus in the filling mode while FIG. 6 shows the apparatus in the rest mode.

Figure 7:
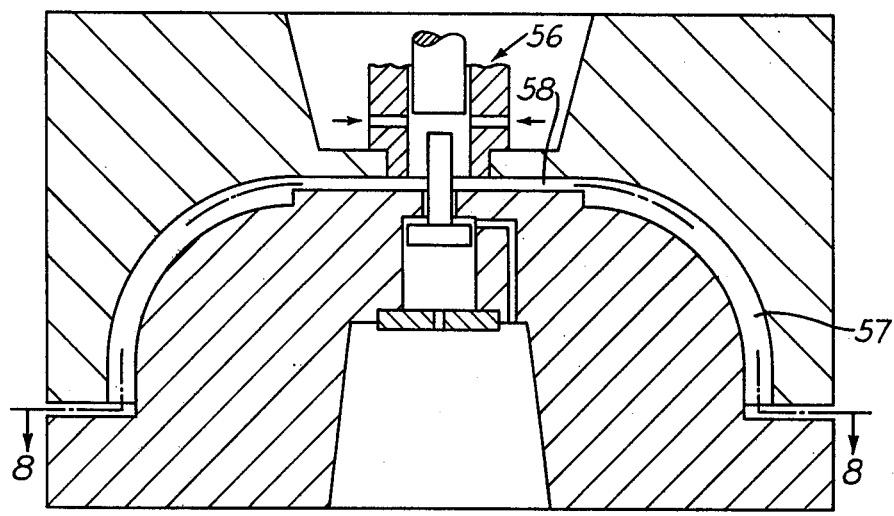
FIG. 7 shows a fourth example of the apparatus with sprue channel in vertical section.
Figure 8:
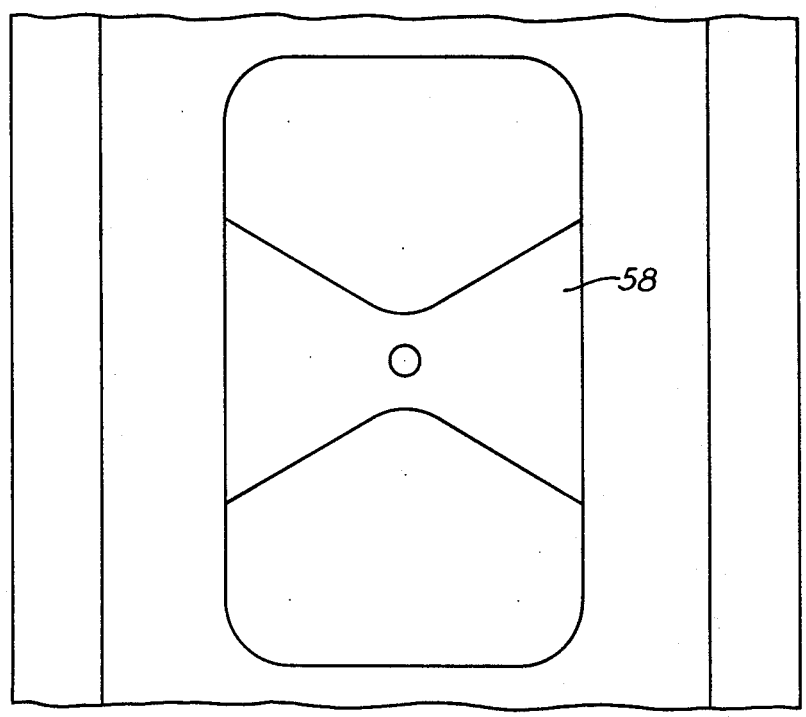
FIG. 8 shows the apparatus of FIG. 7 in section through the plane of the sprue.

In FIGS. 7 and 8, a sprue channel 58 is arranged between the mixing apparatus 56 and mold cavity 57.

Figure 9:
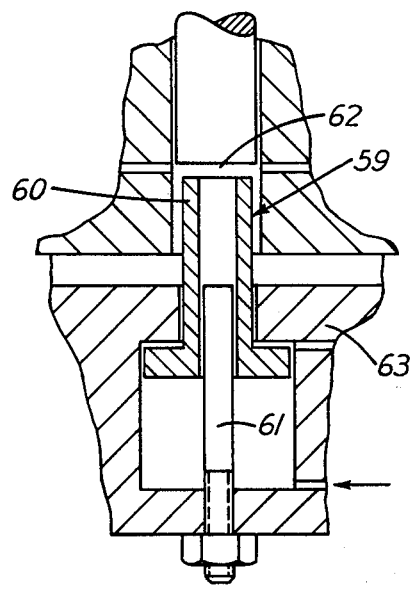
FIG. 9 shows a fifth example of the apparatus with displacement piston in the form of a sleeve and a fixed core during the mold filling process.
Figure 10:
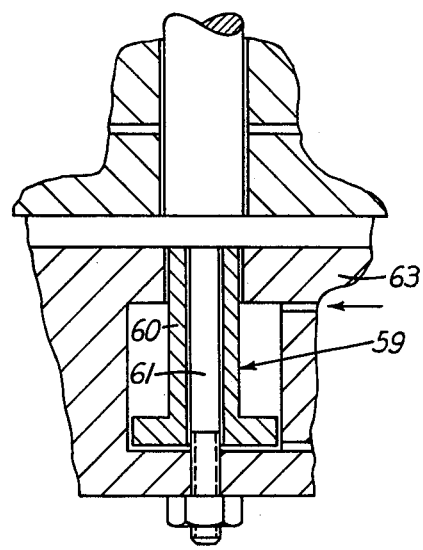
FIG. 10 shows the apparatus of FIG. 9 immediately after the mold filling process.

In FIGS. 9 and 10, the displacement piston 59 consists of a sleeve 60 and a fixed core 61. In the filling position, (FIG. 9) there is a cavity inside the sleeve 60 to catch the first portions of component injected into the mixing chamber 62. When the sleeve 60 is returned to its resting position (FIG. 10) the mixture contained in it is displaced by the core 61. Finally, the end surfaces of the sleeve 60, core 61 and wall of the mold 63 form one plane surface so that the finished molded product has no sprue marks.

Figure 11:
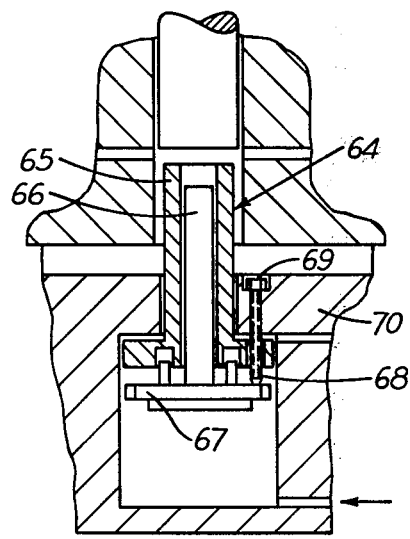
FIG. 11 shows a sixth example of the apparatus, which is a modification of the fifth example with movable core, during the mold filling process.
Figure 12:
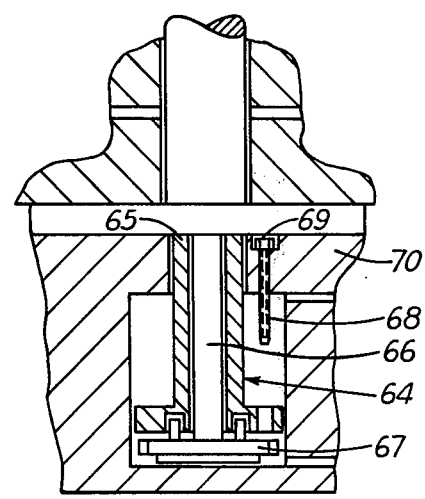
FIG. 12 shows the apparatus of FIG. 11 immediately after the mold filling process.

In FIGS. 11 and 12, the displacement piston 64 also consists of a sleeve 65 and core 66 but in this case the core forms a piston which is slidable inside the sleeve 65. During the filling position (FIG. 11) the plate 67 of the core 66 abuts against an adjustable stop 68 by means of which the depth of the cavity inside the sleeve 65 can be made as small as desired. The bore for the stop 68 is provided with a removable cover 69 which is flush with the surface of the wall of the mold. On return to the resting position (FIG. 12) the sleeve 65 takes the core 66 with it. Its dimensions are such that in the resting position, its end surface forms one continuous plane with the end surface of the sleeve 65 and the surface of the wall of the molding tool 70.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for mixing foamable thermosetting resin reactants and introducing them into a mold comprising introducing said reactants into a mixing chamber through injection apertures in its side wall portion, said mixing chamber having an outlet aperture communicating with the cavity of the mold and prior to the introduction of reactants into the mixing chamber inserting a displacement piston having a smaller cross-section than the outlet aperature of said mixing chamber into said mixing chamber through said outlet aperture such that the injection apertures communicate with the mold cavity by means of a generally annular passage whereby a foamed resin product substantially free of sprue and surface marks is produced.

* * * * *